United States Patent
Kernkamp

(10) Patent No.: US 6,413,029 B1
(45) Date of Patent: Jul. 2, 2002

(54) CARGO LOCK FOR FIXING CARGO PALLETS TO SEAT TRACKS IN AIRCRAFT

(76) Inventor: Willem J. A. Kernkamp, 825 Tufts St., Burbank, CA (US) 91504

( * ) Notice: Subject to any disclaimer, the term of this patent is extended or adjusted under 35 U.S.C. 154(b) by 0 days.

(21) Appl. No.: 09/772,814

(22) Filed: Jan. 30, 2001

Related U.S. Application Data

(62) Division of application No. 09/120,552, filed on Jul. 22, 1998, now Pat. No. 6,193,453.
(60) Provisional application No. 60/053,643, filed on Jul. 24, 1997.

(51) Int. Cl.[7] ................................................ B60P 7/08
(52) U.S. Cl. ........................... 410/79; 410/77; 410/92
(58) Field of Search ............................. 410/77, 78, 79, 410/80, 92, 94, 95, 69, 105; 244/118.1, 137.1; 414/536; 248/500, 503, 503.1

(56) References Cited

U.S. PATENT DOCUMENTS

| | | |
|---|---|---|
| 3,251,489 A | 5/1966 | Davidson |
| 3,262,588 A | 7/1966 | Davidson |
| 3,381,921 A | 5/1968 | McDonough et al. |
| 3,693,920 A | 9/1972 | Trautman |
| 3,796,397 A | 3/1974 | Alberti |
| 3,800,713 A | 4/1974 | Nordstrom |
| 3,810,534 A | 5/1974 | Prete, Jr. |
| 3,906,870 A | 9/1975 | Alberti |
| 3,986,460 A | 10/1976 | Voigt et al. |
| 3,995,562 A | 12/1976 | Nordstrom |
| 4,089,275 A | 5/1978 | Pelletier |
| 4,121,789 A | 10/1978 | Lent et al. |
| 4,234,278 A | 11/1980 | Harshman et al. ............ 410/69 |
| 4,379,668 A | 4/1983 | Pelletier ...................... 410/77 |
| 4,557,648 A | 12/1985 | Koch et al. ................... 410/78 |
| 5,131,606 A | 7/1992 | Nordstrom |
| 5,234,297 A | 8/1993 | Weick et al. ................. 410/77 |
| 5,383,630 A | 1/1995 | Flatten |
| 5,433,564 A | 7/1995 | Sundseth ..................... 410/77 |
| 5,573,359 A | 11/1996 | Moradians ................... 410/69 |
| 5,609,452 A | 3/1997 | Looker et al. ............. 410/105 |
| 6,193,453 B1 * | 2/2001 | Kernkamp ................... 410/79 |

* cited by examiner

Primary Examiner—Stephen T. Gordon
(74) Attorney, Agent, or Firm—Lyon & Lyon LLP

(57) ABSTRACT

A cargo locking device for locking of freight in a vehicle such as the stowage of containers or pallets in aircraft in which track connectors, namely the tensile studs are arranged in such a manner that tensile load is distributed between the floor beams. The cargo lock has a lock length about equal to or exceeding the transverse beam pitch, the tensile studs being placed in groups at both ends of the lock and the pawls in the middle of the lock such that pawl loads are split between the forward and the aft stud.

19 Claims, 6 Drawing Sheets

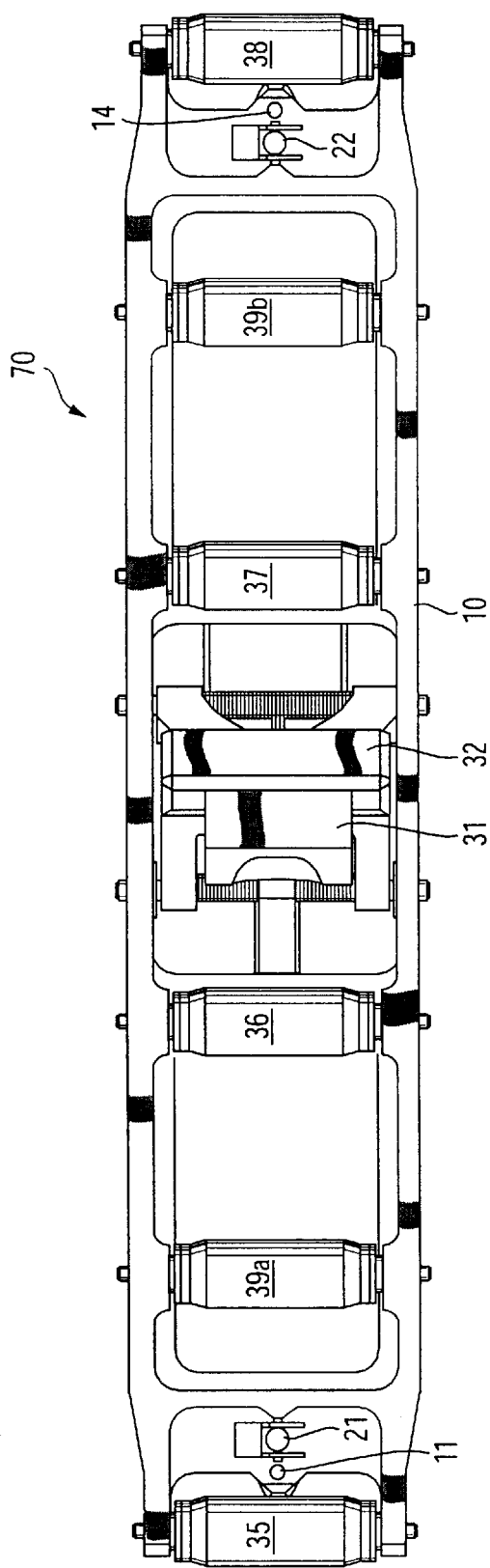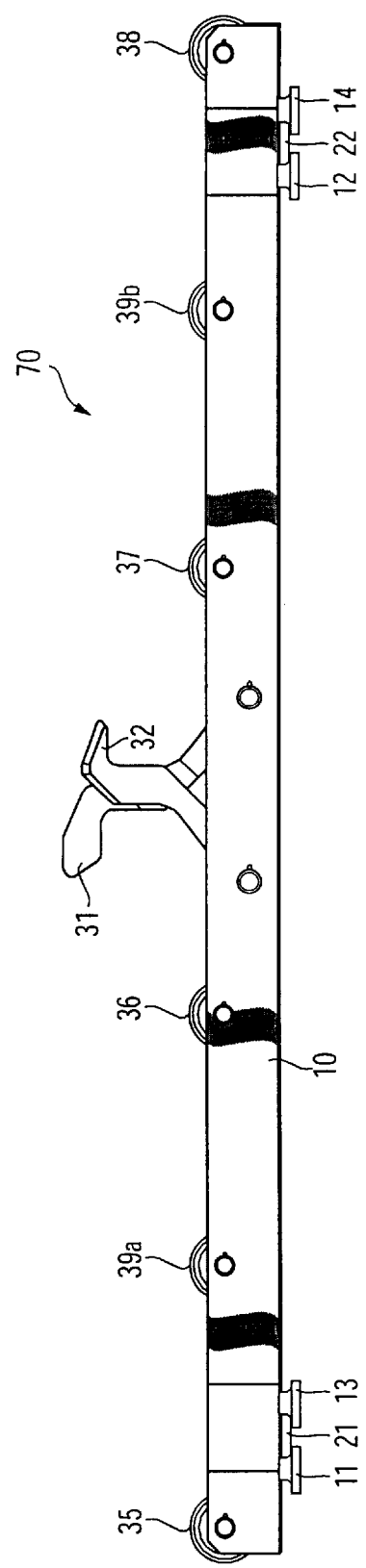

CARGO LOCK FOR FIXING CARGO PALLETS TO SEAT TRACKS IN AIRCRAFT

RELATED APPLICATION

This application is a divisional of application Ser. No. 09/120,552 filed Jul. 22, 1998, now U.S. Pat. No. 6,193,453, which claims priority to provisional application Serial No. 60/053,643 filed Jul. 24, 1997.

BACKGROUND OF THE INVENTION

The field of the present invention relates to a cargo lock device that holds cargo pallets in place within vehicles such as aircraft. The aircraft includes seat or cargo tracks located in the cargo floor. The seat tracks are located in the cargo floor and run lengthwise through the aircraft. The seat tracks are supported at regular intervals typically by transverse floor beams. Typically, the cargo lock device includes hooks referred to as pawls and a number of support rollers. The device is connected to a seat track by means of tensile studs and shear ties. The studs restrain the lock against vertical motion and the shear ties restrain the lock against horizontal motion.

The present inventor has recognized that these cargo locks are structurally inefficient for the aircraft floor because of their geometry and the locations of their studs, shear ties and rollers relative to the pawls. With the lock in an unfavorable position in the seat track relative to the transverse floor beams, most of the load applied by the cargo pallet will transfer through just one floor beam. This situation occurs when the stud that is closest to the pawls is located directly over top of a floor beam. For example, U.S. Pat. No. 5,433,564 discloses a device which employs a resiliently deformable section in its floor hooks, but does not disclose relative distribution of tensile forces relative to floor support points.

The existing lock designs may minimize cost and weight of the locks themselves, but these cost and weight savings are disadvantageously offset by the additional structure required in the transverse floor beams and the seat tracks.

SUMMARY OF THE INVENTION

The present invention is directed to an improved cargo locking device for locking of freight in a vehicle such as the stowage of containers, or pallets in aircraft. The improved cargo locking device avoids the aforementioned disadvantages by arranging track connectors, e.g. the tensile studs, in such a manner that tensile load is distributed between the floor beams.

In its preferred embodiment, the cargo lock has a lock length about equal to or exceeding the transverse beam pitch. The tensile studs will be placed in groups at both ends of the lock. The pawls will be placed in the middle of the lock. This arrangement will split the pawl loads (from the cargo pallet) between the forward and the aft stud. The separation of the studs is such that the combined loading from the two groups of studs into a single transverse floor beam never exceeds about 50% of the pawl load. The invention will now be described further as illustrated on the attached drawings of examples of its preferred embodiments.

BRIEF DESCRIPTION OF THE DRAWINGS

FIG. 2 is a top plan view of the cargo lock of FIG. 1.

FIG. 3 is a side view of the cargo lock of FIG. 1.

DETAILED DESCRIPTION OF THE PREFERRED EMBODIMENTS

The preferred embodiments of the present invention will now be described with reference to the drawings. To facilitate description, any identifying numeral representing an element in one figure will represent the same element in any other figure.

Figure 1:
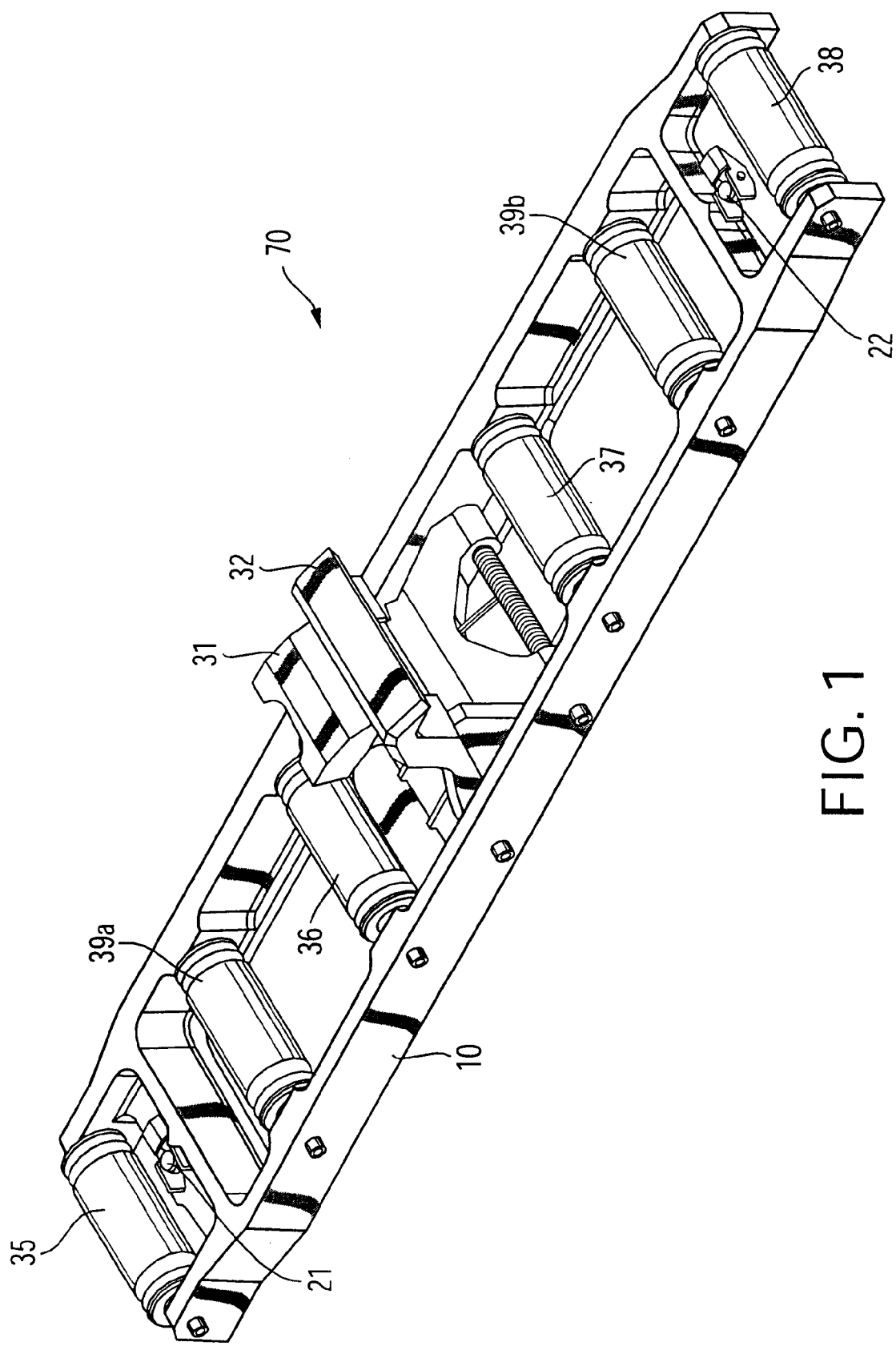
FIG. 1 is a perspective view of a cargo lock according to a preferred embodiment of the present invention.
Figure 4:
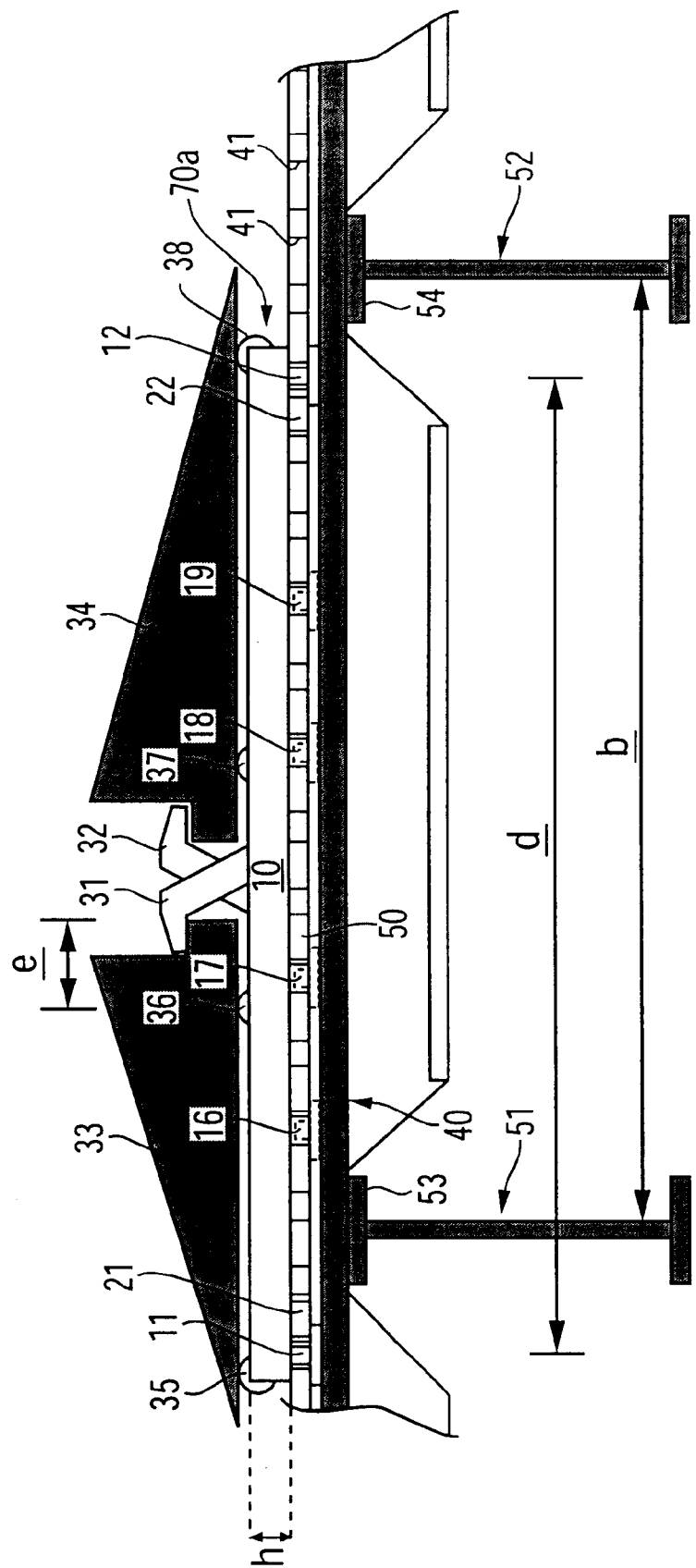
FIG. 4 is a side view of a cargo lock similar to the cargo lock in FIG. 1 and further including a cross section of the transverse floor beams and supporting seat track.
Figure 5:
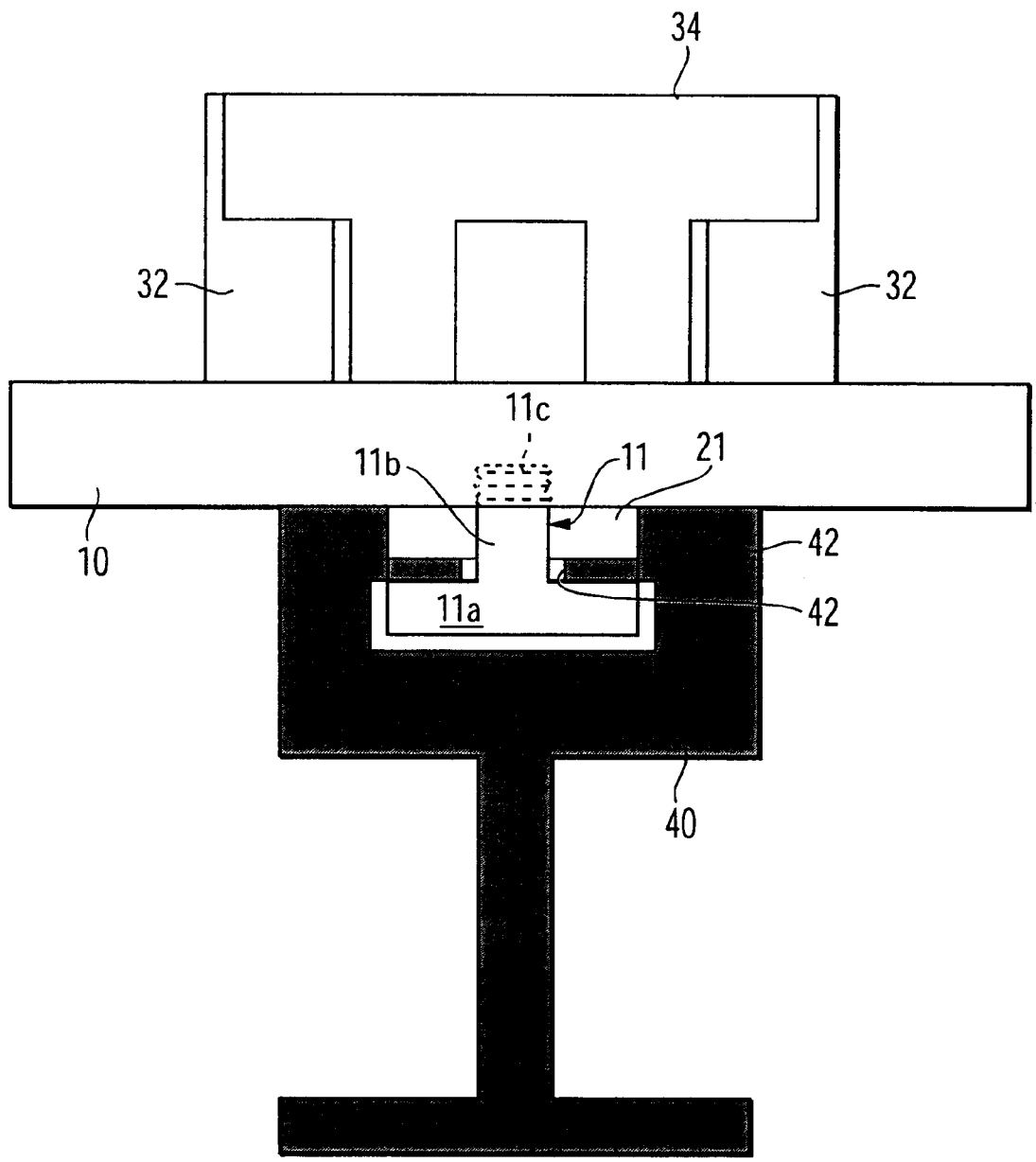
FIG. 5 is a front view of the cargo lock in the seat track of FIG. 4.
Figure 6:
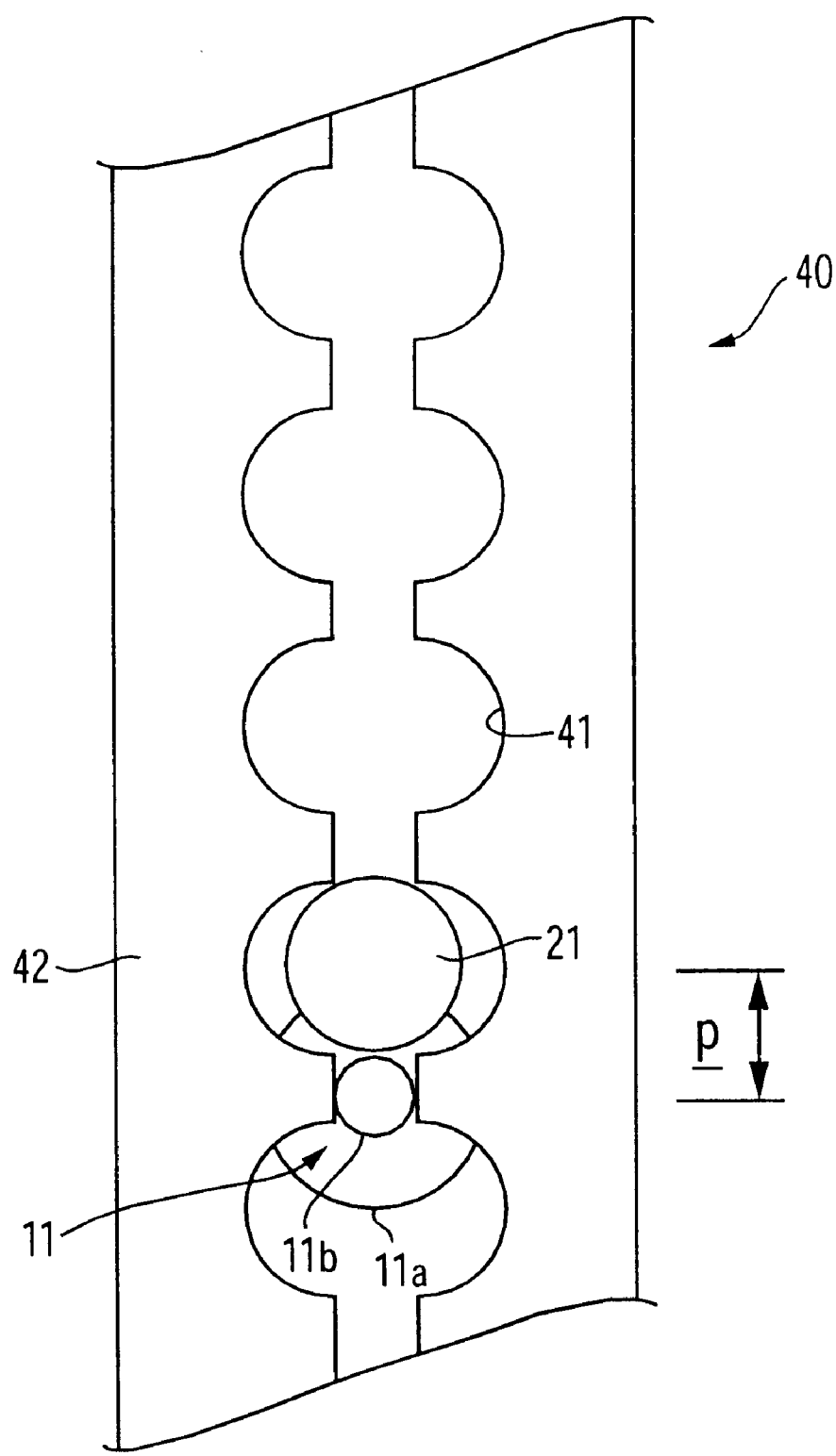
FIG. 6 is a top view of a tensile stud and a shear tie in a seat track.
Figure 7:
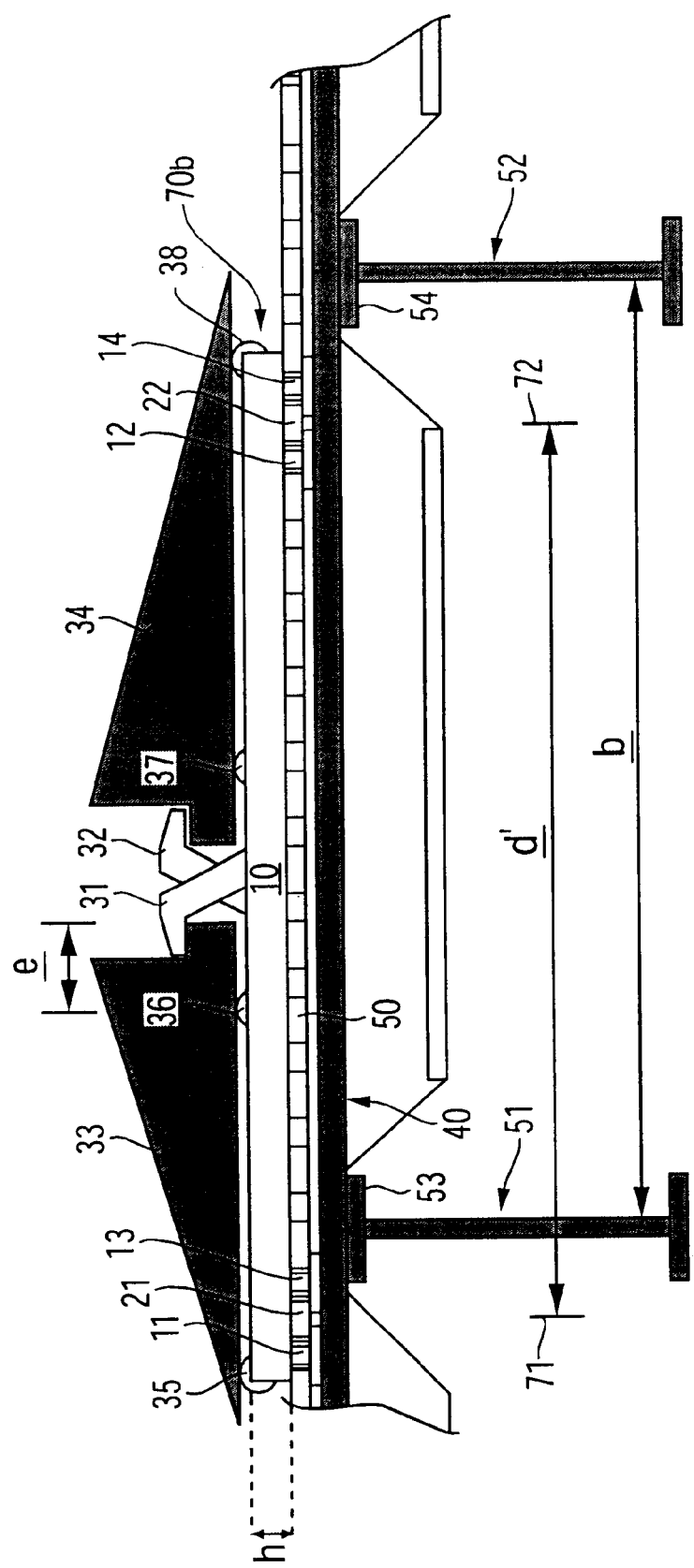
FIG. 7 is a side view of an alternate embodiment of the cargo lock also of similar configuration to the cargo lock of FIG. 4.

FIGS. 1–3 illustrate a cargo lock 70 having a configuration which is generally applicable to the details in the cargo lock 70a embodiment of FIGS. 4–6 or the cargo lock 70b embodiment of FIG. 7.

Referring to FIGS. 1–6, the cargo lock 70/70a is connected to the seat track 40 arranged in the floor of the aircraft, the floor 50 being supported by beams 51, 52. The cargo lock 70/70a comprises a frame or baseplate 10, a pair of pawls 31 and 32, shear ties 21 and 22, and track connectors, shown as tensile studs 11 and 12. The pawls 31 and 32 are located in the center of the cargo lock 70/70a. The pawls 31, 32 have a curved or hook portion which secure cargo pallets 33 and 34 to the cargo lock 70/70a. For the purposes of this description, a pawl may comprise any suitable connector which secures the cargo pallet to the cargo lock. The shear ties 21 and 22 fit in scalloped holes 41 in the seat track 40 to prevent horizontal movement of the cargo lock 70/70a.

Details of the tensile studs 11, 12 are best shown in FIG. 5. The stud 11 is in the shape of an inverted "T" formed with a flange portion 11a and a leg portion 11b. Typically, the leg portion 11b may have threads 11c at the end for attachment to the baseplate 10 either directly or via a nut or other suitable connection mechanism.

The tensile studs 11 and 12 are inserted into the seat tracks 40 through the scalloped holes 41 and subsequently moved to a position in-between the holes 41 by sliding a short distance p along the length of the seat track 40 (before the shear ties 21 and 22 are inserted). In this position, the circular flange 11a of each stud 11 is locked below the seat track inner flange 42. The lock 70/70a is secured in this position by inserting shear ties 21 and 22. Thus secured in seat track 40, the lock 70/70a is held in position both vertically and horizontally.

The tensile stud 11 is located at one side of the pawls 31 and 32 on baseplate 10 and tensile stud 12 at the other side of the pawls 31 and 32 on baseplate 10. The distance between the two tensile studs is d. The pawls 31 and 32 are centrally located near the middle of the distance d. The transverse floor beams 51 and 52 support the seat track 40 at an interval b. The cargo lock is designed with a distance d preferably selected to be as close to b as possible, with the maximum benefit realized as d is equal to b or as d exceeds b.

The cargo lock 70/70a includes a plurality of rollers 35, 36, 37 and 38 secured to the baseplate 10. The rollers 35–38 extend outward from the bottom of the frame 10 and serve to allow the cargo pallets to roll along the cargo locks thereby facilitating movement of pallets 33 and 34 during loading and unloading. Outer rollers 35, 38 are located at the extremities of baseplate 10. The purpose of these outer rollers 35, 38 is to ensure that the pallets edge does not become blocked against the edge of the baseplate 10. Inner rollers 36, 37 are located close to pawls 31 and 32 within a distance e. The purpose of locating inner rollers 36, 37 close to the pawls 31, 32 is to distribute a load from a single container in the downward direction over as much as possible the full length of the baseplate 10. Without these inner rollers, this down load would be concentrated at an extremity of baseplate 10 on either roller 35 or roller 38.

FIG. 7 illustrates an alternative embodiment for a cargo lock in which the same reference numerals have been used as in FIGS. 1 through 6 to indicate corresponding parts. In the embodiment of FIG. 7, the number of tensile studs has been increased to two per side resulting in studs 11 and 13, the first track connector, on one side and studs 12 and 14, the second track connector, on the other side, which is the same number of studs as illustrated in FIGS. 1–3. The centroid 71 of the group of tensile studs 11 and 13 is the location of the effective working axis of force when both tensile studs are equally loaded with a vertical force (for groups comprising of two tensile studs the centroid is located half way between tensile studs). Similarly, the centroid 72 of the group of tensile studs 12 and 14 is located in between these studs. The distance between the centroids 71 and 72 of the two groups of tensile studs now defines d'. The pawls 31 and 32 continue to be located near the middle of the distance d'. One advantage of the alternative embodiment is that the load per tensile stud is reduced. In addition, the baseplate 10 and the seat track 40 are fixed together at the stud groups more securely. This arrangement may have several additional beneficial effects, including but not limited to: 1) preventing the potential rolling over of the top flanges 53 and 54 of the transverse floor beams 51 and 52 when the stud groups are located offset from the beams as shown; and 2) reducing maximum bending moment in baseplate 10 which occurs near the pawls 31 and 32.

In use, the tensile studs secure the cargo locks to the tracks in the event of a downward acceleration of the vehicle resulting in large tensile forces being applied to the lock. The tensile force is transmitted from the pawls 31, 32, through the baseplate 10, and to the studs 11, 12. The studs then transmit the upward force to the track 40 which in turn transmit the forces to the floor and support beams 51, 52. The distance d is defined as the length of the effective separation of the tensile attachment points of the cargo lock 70a to the tracks. In the cargo lock 70a of FIG. 4, the tensile attachment points are located at the center of the tensile studs 11 and the center of tensile stud 12. The tensile studs 11, 12 are intentionally positioned at the outer ends of the cargo lock 70a so as to provide desired separation between the attachment points. Where additional tensile studs are provided such as in cargo lock 70b of FIG. 7, the attachment points (i.e. the centroid of attachment) are between the stud pairs, namely centroid 71 between stud pair 11, 13 and centroid 72 between stud pair 12, 14. The stud pairs of cargo lock 70b are still separated by a distance d' providing the desired effective separation between the attachment points.

If additional studs are included along the length of the cargo lock (for example studs 16, 17, 18, 19 shown in FIG. 4 in phantom) such studs are preferably designed in conjunction with the flexibility of the tracks and aircraft floor so as not to negate the force separation quality of the primary attachment points at the outer ends of the cargo lock. Such flexibility may be accomplished by including additional vertical spacing or elastomeric connection in the center studs 16–19 such that even though the upward tensile force is applied at the center of the cargo lock by the pawls 31, 32, the majority of the upward tensile force is transferred to the primary end studs 11, 12 and thereby distributed between the support beams 51, 52.

In a preferred construction, the cargo lock is elongated a having a relatively low aspect ratio r defined as the ratio of the height h (i.e. a maximum height of the lock as measured with the pawls 31, 32 retracted) to the length d (the effective distance between the end attachment points):

$$r = h / d.$$

Preferably, the aspect ratio of an elongated cargo lock is less than about ⅛th (0.125) or even smaller, namely about 0.10, with certain implementations being about 0.06. The aspect ratio h/d of the cargo lock 70a of FIG. 4 and the aspect ratio h/d' of the cargo lock 70b of FIG. 7 are about 0.05. In a Boeing 727 aircraft, the distance b between the support columns is about 20 inches. In actual construction, the dimensions of a cargo lock 70b for this Boeing 727 aircraft may be $$h = 1.15 \text{ in}$$
$$d = 20 \text{ in}$$
$$r = 0.06$$

In smaller aircraft, the distance between support beams will be smaller, but the size of the cargo locks will also be smaller but would be designed such that $d \geq b$ and having an aspect ratio r less than 0.125 to provided the desired spacing of attachment points.

In a preferred configuration, the cargo lock comprises
- a baseplate with a lengthwise orientation over a seat track;
- one or more pawls to secure cargo pallets to the lock mounted on the baseplate;
- a tensile stud set (of one or more tensile studs) mounted on the baseplate on each side of the pawl(s), the stud set being spaced from the pawl(s) at a distance that is about half the spacing of the seat track support points;
- shear ties mounted on the baseplate;
- rollers mounted to the baseplate on opposite sides of the pawl(s).

Preferably, the distance between the pawl(s) and the tensile studs is larger than half the spacing of the seat track support points. The distance may be somewhat smaller, but if the distance is too small, the preferred weight distribution advantages may be lost.

The rollers are preferably located a distance e (see FIG. 3) away from the pawl(s) where e is about less than one-fifth the spacing of the seat track support points.

In another preferred configuration, a single stud is used on each side of the pawls.

In another preferred configuration, a pair of tensile studs are disposed on each side of the pawls, the studs of the pair being separated by about one seat track hole distance (2p).

In another preferred embodiment, a shear tie is located in-between the two tensile studs in a group.

In another preferred embodiment, a single stud is replaced with a group of two or more tensile studs in any arrangement for which the distance between the pawl(s) and the closest tensile stud is about equal to half the distance between the seat track support points.

In another preferred embodiment, a cargo lock may include additional rollers to further distribute the compressive load across the floor. The cargo locks 70a/70b of FIGS. 4 and 7 have four rollers 35–38. A cargo lock may include for example six rollers as the lock 70 in FIGS. 1–3, which has a roller 39a mounted to the baseplate 10 between rollers 35 and 36 and another roller 39b mounted between rollers 37 and 38 at the other end of the baseplate 10. The cargo lock may be provided with any number of additional rollers. The rollers are preferable separated as much as possible to distribute the loads. In the embodiment of FIGS. 1–3, the center rollers 36, 37 are located adjacent the pawls 31, 32. The rollers 36, 37 are shown so close to the pawls 31, 32 that the pawls 31, 32 or the rollers 36, 37 may require movable connections (not shown) to the baseplate 10 in order to accommodate retraction of the pawls 31, 32.

Though the present invention has been set forth in the form of its preferred embodiments, it is nevertheless intended that modifications to the disclosed embodiments may be made without departing from inventive concepts set forth herein. The invention, therefore, is not to be restricted except in the spirit of the claims that follow.

What is claimed is:

1. A system for securing a pallet to tracks in a vehicle having transverse support beams spaced by a given spacing, comprising:
    a cargo lock for securing the pallet to a track, the cargo lock having (a) a pawl for engaging the pallet and (b) first and second track connectors for securing the cargo lock to the track, wherein the pawl is centrally positioned on the cargo lock and wherein the first and second track connectors are mounted on opposite ends of the cargo lock;
    wherein length of the cargo lock and spacing of the first and second track connectors from the pawl are selected such that total tensile load applied through the pawl is distributed to ensure that individual tensile load applied to any transverse support beam does not exceed about 50% of the total tensile load applied through the pawl.

2. A system according to claim 1 wherein the first track connector comprises a pair of closely spaced tensile studs.

3. A system according to claim 2 wherein the cargo lock includes a shear tie located in-between the tensile studs.

4. A system according to claim 2 wherein the second track connector comprises a pair of closely spaced tensile studs.

5. A system according to claim 1 wherein the first track connector comprises a single tensile stud.

6. A system according to claim 1 wherein the first and second track connectors are evenly spaced from the pawl.

7. A system according to claim 1 wherein the cargo lock includes at least first and second rollers for supporting the pallet, the first and second rollers being disposed on opposite sides of the pawl.

8. A system according to claim 1 wherein the cargo lock includes a second pawl.

9. A system for securing a pallet to tracks in a vehicle having transverse support beams spaced by a given spacing, comprising:
    a cargo lock for securing the pallet to a track, the cargo lock having (a) at least a first pawl for engaging the pallet and (b) first and second track connectors for securing the cargo lock to the track, wherein the pawl is generally centrally positioned on the cargo lock and wherein the first and second track connectors are mounted on opposite ends of the cargo lock;
    wherein the cargo lock is constructed and arranged with spacing of the first and second track connectors from the pawl and with a length such that total tensile load applied through the pawl is distributed to ensure that individual tensile load applied to any transverse support beam does not exceed about 50% of the total tensile load applied through the pawl.

10. A system according to claim 9 wherein the first track connector comprises a pair of closely spaced tensile studs.

11. A system according to claim 10 wherein the cargo lock includes a shear tie located in-between the tensile studs.

12. A system according to claim 9 wherein the second track connector comprises a pair of closely spaced tensile studs.

13. A system according to claim 9 wherein the first track connector comprises a single tensile stud.

14. A system according to claim 9 wherein the first and second track connectors are evenly spaced from the pawl.

15. A system according to claim 9 wherein the cargo lock includes at least first and second rollers for supporting the pallet, the first and second rollers being disposed on opposite sides of the pawl.

16. A system according to claim 1 wherein the cargo lock includes a second pawl disposed adjacent the first pawl.

17. A system securing a pallet to tracks in a vehicle having transverse support beams spaced by a given spacing, comprising:
    a cargo lock for securing the pallet to a track, the cargo lock having (a) a pawl for securing the pallet and (b) first and second track connectors for securing the cargo lock to the track, wherein the pawl is centrally positioned on the cargo lock and wherein the first and second track connectors are disposed on opposite ends of the cargo lock;
    means for distributing total tensile load applied through the pawl such that an individual tensile load applied to any transverse support beam does not exceed about 50% of the total tensile load applied through the pawl.

18. A method of securing a pallet to tracks in a vehicle having transverse support beams spaced by a given spacing, comprising the steps of:
    installing a cargo lock to a single track, the cargo lock having (a) a pawl for engaging the pallet and (b) first and second track connectors for securing the cargo lock to the track;
    centrally positioning the pawl on the cargo lock;
    mounting the first and second track connectors on opposite ends of the cargo lock;
    selecting length of the cargo lock and spacing the first and second track connectors from the pawl such that total tensile load applied through the pawl is distributed such that individual tensile load applied to any transverse support beam does not exceed about 50% of the total tensile load applied through the pawl.

19. A method according to claim 18 further comprising spacing the track connectors from the pawl at a distance that is at least about half the spacing of the support beams.

* * * * *